(12) United States Patent
Frost et al.

(10) Patent No.: US 7,687,164 B2
(45) Date of Patent: Mar. 30, 2010

(54) ON-LINE SYSTEM IDENTIFICATION AND CONTROL OF FUEL CELL HUMIDIFICATION VIA HFR MEASUREMENTS

(75) Inventors: Patrick Frost, Rochester, NY (US);
Manish Sinha, Pittsford, NY (US);
Jason R. Kolodziej, West Henrietta, NY (US)

(73) Assignee: GM Global Technology Operations, Inc., Detroit, MI (US)

( * ) Notice: Subject to any disclaimer, the term of this patent is extended or adjusted under 35 U.S.C. 154(b) by 376 days.

(21) Appl. No.: 11/858,964

(22) Filed: Sep. 21, 2007

(65) Prior Publication Data
US 2009/0081489 A1   Mar. 26, 2009

(51) Int. Cl.
*H01M 8/04*  (2006.01)
*H01M 8/00*  (2006.01)
(52) U.S. Cl. .......................... 429/13; 429/22
(58) Field of Classification Search ............. 429/12–13, 429/22–25
See application file for complete search history.

(56) References Cited

U.S. PATENT DOCUMENTS 6,376,111 B1 * 4/2002 Mathias et al. ............... 429/13
6,472,090 B1 * 10/2002 Colbow et al. ............... 429/13
2006/0263653 A1 * 11/2006 Sinha et al. ................... 429/13
2008/0166609 A1 * 7/2008 Kitamura ..................... 429/23

FOREIGN PATENT DOCUMENTS

JP    2007173071 A  *  7/2007
WO   WO 2006095606 A1  *  9/2006

OTHER PUBLICATIONS

Machine Translation of JP2007-173071.*
Jean-Jacques E. Slotine, Weiping Li; Applied Nonlinear Control, p. 359-375.
V.M. Becerra, Lecture notes from "Advanced System Identification," Unitersity of Reading.

* cited by examiner

*Primary Examiner*—Basia Ridley
*Assistant Examiner*—Jacob Buchanan
(74) *Attorney, Agent, or Firm*—Fraser Clemens Martin & Miller LLC; J. Douglas Miller

(57) ABSTRACT

A fuel cell system is provided, including an HFR measurement device in electrical communication with a fuel cell stack. The HFR measurement is used online to measure an HFR of the fuel cell stack suitable for calculation of a d(HFR)/d(RH) ratio. A humidity regulator is provided in fluid communication with the fuel cell stack. A controller periodically changes stack operating conditions to perturb an RH of the fuel cell stack, process the HFR response, and compute the d(HFR)/d(RH) ratio. A method for online identification and control of the fuel cell stack humidification is also provided. The d(HFR)/d(RH) ratio is an auxiliary measurement of membrane hydration which is used as a feedback for hydration control.

14 Claims, 3 Drawing Sheets

ON-LINE SYSTEM IDENTIFICATION AND CONTROL OF FUEL CELL HUMIDIFICATION VIA HFR MEASUREMENTS

FIELD OF THE INVENTION

The present disclosure relates to a fuel cell system and, more particularly, to a fuel cell stack hydration measurement system and method for measuring the hydration of the fuel cell stack in operation.

BACKGROUND OF THE INVENTION

A fuel cell has been proposed as a clean, efficient, and environmentally responsible energy source for electric vehicles and various other applications. In particular, the fuel cell has been identified as a potential alternative for the traditional internal-combustion engine used in modern vehicles. One type of fuel cell is known as a proton exchange membrane (PEM) fuel cell. Individual fuel cells can be stacked together in series to form a fuel cell stack. The fuel cell stack is capable of supplying a quantity of electricity sufficient to provide power to a vehicle.

As is well understood in the art, the membranes within the fuel cell stack must have a certain relative humidity (RH) for efficient performance. Measures are often taken to maintain the membrane hydration within a desired range that optimizes proton conduction across the membranes. For example, in U.S. Pat. No. 6,376,111, hereby incorporated herein by reference in its entirety, a controller utilizes feedback to control the humidity of a fuel cell assembly. Humidifiers or water vapor transfer (WVT) devices are commonly used to humidify inlet reactant gases provided to the fuel cell stack. Thermal control strategies based on a relationship between RH and fuel cell temperature, as measured by the coolant temperature, for example, have also been employed in controlling membrane hydration. Other fuel cell parameters, such as stoichiometry and pressure, are further known to affect fuel cell humidification.

The level of humidification in fuel cell systems of the art has been controlled in response to a variety of feedback indicators including inlet RH, outlet RH, temperature, pressure, flow rate, and electrical current measurements. However, typical sensors employed in measuring these indicators often exhibit drift and may be unreliable. Relative humidity sensors, in particular, are known to have limited use in fuel cell applications due to corrosion and swelling of the sensors with repeated exposure to liquid water. Thus, typical sensors have not been desirably effective for purposes of humidification feedback-control in fuel cell systems.

High frequency resistance (HFR) has previously been used as an offline lab diagnostic technique for indirectly measuring MEA hydration in the fuel cell. Typical HFR sensors measure an AC resistance of the fuel cell based on a high-frequency ripple current. HFR is particularly sensitive to changes in RH. However, HFR is also highly sensitive to other fuel cell conditions, such as individual differences in overall membrane resistance, plate resistance, and contact resistance. Absolute HFR measurements are particularly susceptible to variation in contact resistance. Since the contact resistance of a fuel cell stack varies during operation with changes in compression force, due in part to swelling and contracting of membranes, absolute HFR measurements have heretofore not been employable in online hydration measurements of operating fuel cell stacks.

There is a continuing need for an online system and method for reliably measuring humidification of the fuel cell stack in operation. Desirably, the online system and method employs HFR measurements for monitoring and feedback control of fuel cell stack humidification.

SUMMARY OF THE INVENTION

In concordance with the instant disclosure, an online system and method that employs HFR measurements for reliably monitoring and controlling humidification of the fuel cell stack in operation, is surprisingly discovered.

In one embodiment, a fuel cell system includes a fuel cell stack with a plurality of fuel cells. Each of the fuel cells has an electrolyte membrane disposed between an anode and a cathode. The fuel cell system further includes an HFR measurement device in electrical communication with the fuel cell stack. The HFR measurement device is adapted to measure an HFR of the fuel cell stack suitable for calculation of a $d(HFR)/d(RH)$ ratio. A humidity regulator is in communication with the fuel cell stack and adapted to adjust an RH thereof to within a desired range. A controller is also in electrical communication with the HFR measurement device and the humidity regulator. The controller is adapted to control the humidity regulator in response to the $d(HFR)/d(RH)$ ratio.

In another embodiment, a method for online identification of a fuel cell stack humidification level includes the steps of supplying a reactant stream to the fuel cell stack and introducing a perturbation in the reactant stream. The perturbation is adapted to provide a transient deviation in an RH of the fuel cell stack. The HFR of the fuel cell stack is measured during the perturbation. A $d(HFR)/d(RH)$ ratio is calculated from the measured HFR and the transient deviation in the RH of the fuel cell stack. The $d(HFR)/d(RH)$ ratio is correlated in a mathematical model to identify an RH of the fuel cell stack.

In a further embodiment, the method includes the step of controlling the humidification level of the fuel cell stack in response to the $d(HFR)/d(RH)$ ratio. The RH of the fuel cell stack is thereby maintained within a desired range

DRAWINGS

The above, as well as other advantages of the present disclosure, will become readily apparent to those skilled in the art from the following detailed description, particularly when considered in the light of the drawings described hereafter.

DETAILED DESCRIPTION OF THE INVENTION

Figure 1:
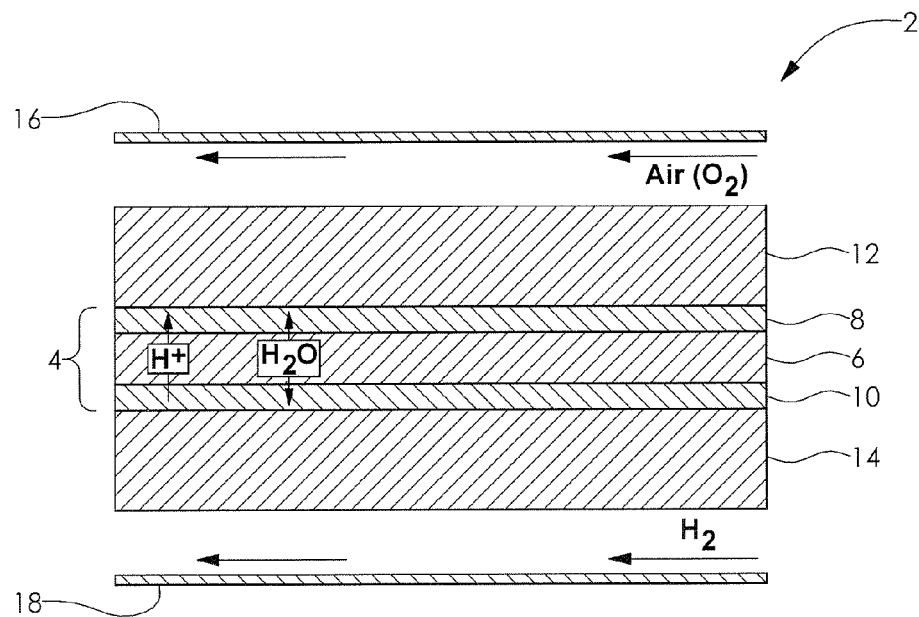
FIG. 1 is a side sectional view of an illustrative fuel cell of the prior art for assembly in a fuel cell stack for use with an online humidification identification system and method of the disclosure.

The following description is merely exemplary in nature and is not intended to limit the present disclosure, application, or uses. It should also be understood that throughout the drawings, corresponding reference numerals indicate like or corresponding parts and features. In respect of the methods disclosed, the steps presented are exemplary in nature, and thus, are not necessary or critical.

FIG. 1 is an exemplary illustration of a fuel cell 2 known in the art. A skilled artisan should appreciate that other fuel cell designs may be used within the scope of the present disclosure. The fuel cell 2 includes a membrane electrode assembly (MEA) 4 having a polymer electrolyte membrane (PEM) 6, a cathode 8, and an anode 10. The PEM 6 is sandwiched between the cathode 8 and the anode 10. The cathode 8 and the anode 10 typically include a finely divided catalyst, such as platinum, supported on carbon particles and mixed with an ionomer. It should be appreciated that the cathode 8 and the anode 10 may be formed from other suitable materials as desired.

A first gas diffusion medium (GDM) layer 12 is disposed adjacent the cathode 8 on a side opposite the PEM 6. A second GDM layer 14 is disposed adjacent the anode 10 on a side opposite the PEM 6. The GDM layers 12, 14 typically facilitate a delivery of gaseous reactants, such as air ($O_2$) and hydrogen ($H_2$), to the MEA 4 for an electrochemical fuel cell reaction. The electrochemical fuel cell reaction produces electricity and water as a chemical product. The fuel cell stack 2 further includes a first plate 16 and a second plate 18 disposed adjacent the first and second GDM layers 12, 14, respectively. The first and second plates 16, 18 have flow channels formed therein for distribution of air ($O_2$) to the cathode 8 and hydrogen ($H_2$) to the anode 10 and for removing residual reactants and the product water from the fuel cell 2. In particular embodiments, the first and second plates 16, 18 are typically at least one of a unipolar plate and a bipolar plate.

Figure 2:
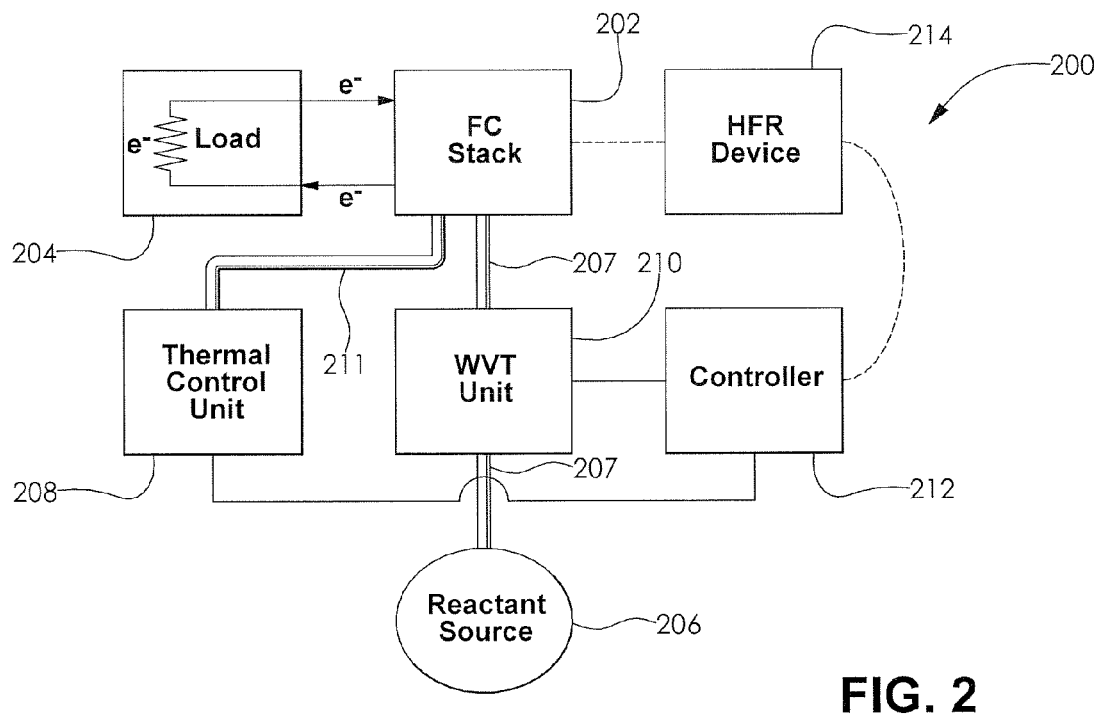
FIG. 2 is a schematic diagram of an online humidification identification and control system according to an embodiment of the present disclosure.

As shown in FIG. 2, a fuel cell system 200 of the present disclosure includes a fuel cell stack 202. The fuel cell stack 202 is assembled from a plurality of the fuel cells 2, for example. The fuel cell system 200 may include more than one fuel cell stack 202 if desired. The fuel cell stack 202 is in electrical communication with an electrical load 204. The electrical load 204 may be, for example, an electric drive motor of an electric vehicle.

The fuel cell stack 202 is in fluid communication with a reactant source 206. The reactant source 206 provides a reactant stream 207, such as one of a cathode stream and an anode stream, to the fuel cell stack 202 for the electrochemical fuel cell reaction. In a particular embodiment, the reactant source 206 is an air compressor adapted to provide compressed air from the ambient atmosphere to the cathodes 8 of the fuel cell stack 202. Likewise, the reactant source 206 may be a storage vessel adapted to provide hydrogen gas to the anodes 10 of the fuel cell stack 202.

In one embodiment, the fuel cell system 200 includes a humidity regulator, such as a thermal control unit 208 and a water vapor transfer (WVT) unit 210. As a nonlimiting example, the thermal control unit 208 is in a heat exchange relationship with a coolant stream 211 supplied to the fuel cell stack 202. The coolant stream may circulate through the fuel cell stack 202 and adjust a temperature, and thereby a relative humidity (RH), of the fuel cell stack 202. As used herein, the RH of the fuel cell stack 202 means an RH of the gases in the fuel cell stack 202, as indicated by an "outlet RH" of exhausted residual gaseous reactants and products, for example. As is known in the art, the thermal control unit 208 may be employed to adjust a temperature of the coolant stream 211 to a desired setpoint selected to maintain the RH of the fuel cell stack 202 within a desired range.

In a further embodiment, the fuel cell system 200 includes the WVT unit 210. The WVT unit 210 is adapted to adjust an RH of the reactant stream 207 supplied to the fuel cell stack 202 as desired. The WVT unit 210 may be a humidifier, for example, that transfers water vapor from a water source. As a further nonlimiting example, the WVT unit 210 extracts water from a water-carrying stream of the fuel cell system 202, such as from one of an anode exhaust stream, a cathode exhaust stream, and a reformate stream. The WVT unit 210 may employ a water-transfer membrane. In another nonlimiting example, the WVT unit 210 transfers water vapor from a reservoir of liquid water. Suitable WVT units 210 are known in the art, and may be used as desired. One of ordinary skill should appreciate that the fuel cell system 200 may include one or both the thermal control unit 208 and the WVT unit 210.

The fuel cell system 200 also includes a controller 212 and a high frequency resistance (HFR) measurement device 214. The controller 212 of the fuel cell system 200 is in electrical communication with the HFR measurement device 214. The controller 212 of the fuel cell system may also be in electrical communication with the thermal control unit 208 and the WVT unit 210. The HFR measurement device 214 is in electrical communication with the fuel cell stack 202 and is adapted to measure an HFR of the fuel cell stack 202 suitable for calculation of a d(HFR)/d(RH) ratio, further explained herein below.

Figure 3:
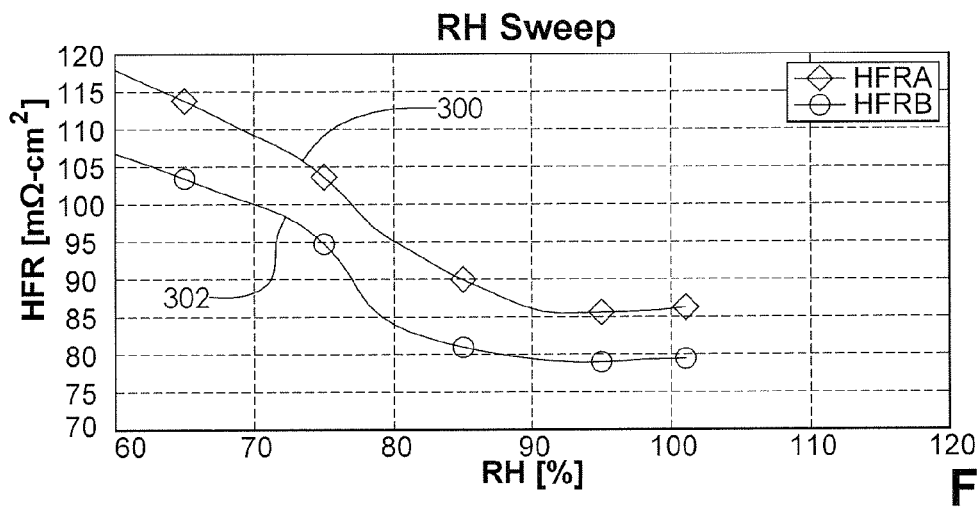
FIG. 3 is a graph depicting illustrative absolute HFR measurements of different fuel cell stacks having substantially identical operating conditions.
Figure 4:
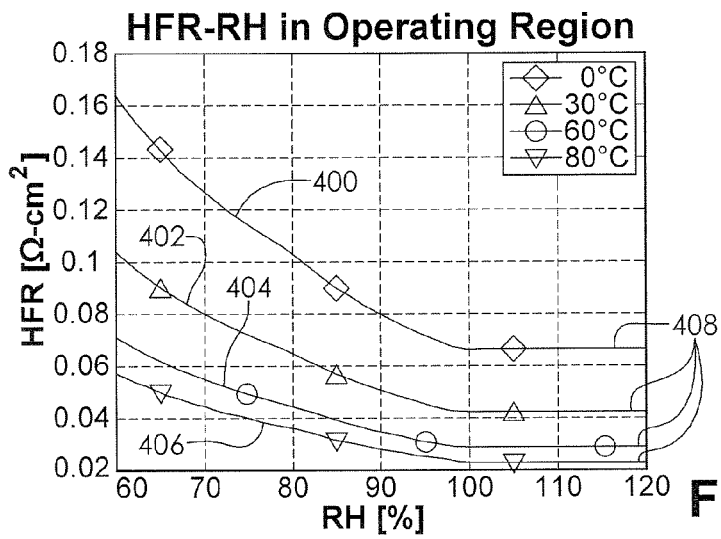
FIG. 4 is a graph depicting illustrative absolute HFR measurements of a fuel cell stack over a typical operation cycle.

As shown in FIG. 3, different fuel cell stacks 202 having substantially identical operating conditions often provide offset absolute HFR values 300 and 302. This is typically due to individual differences in overall plate and contact resistance. As shown in FIG. 4, an increase in fuel cell stack 202 humidity, and a corresponding hydration of the PEM 6, results in a decrease in the absolute HFR measurements. However, the absolute HFR measurements also vary significantly between different operating temperatures. It is now recognized that a slope of the absolute HFR measurements over the range of RH levels, or the d(HFR)/d(RH) ratio, is substantially the same regardless of individual differences in overall plate and contact resistance. The slope directly measures the change in membrane resistance due to hydration while plate and contact resistance remain constant.

Figure 5:
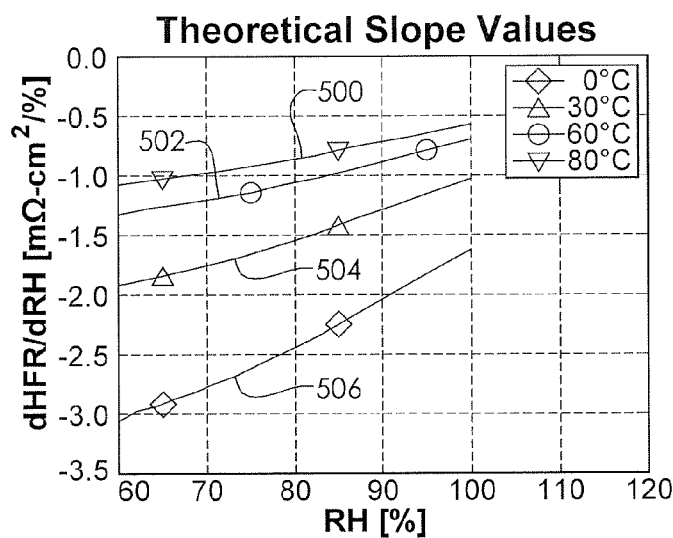
FIG. 5 is a graph depicting illustrative absolute HFR measurements of a fuel cell stack over a range of typical operating temperatures.

The employment of the d(HFR)/d(RH) ratio is particularly useful as an indicator of the RH of the fuel cell stack 202 in operation. The dynamic relationship of the RH of the fuel cell stack 202 to the HFR measurement can be expressed as the following transfer function:

$$Gp(s) = \frac{HFR(s)}{RH(s)} = \frac{Kp}{\tau_p s + 1}$$

where:

$$Kp = \frac{\Delta HFR}{\Delta RH}$$

or $$d(HFR)/d(RH)$$

and $\tau_p$ is a time period of the process. As shown in FIG. 4, the slope Kp (the d(HFR)/d(RH) ratio) decreases as indicated by HFR slopes 400, 402, 404, 406 to a minimum 408 of about zero in the fuel cell stack 202 when fully humidified. Although the d(HFR)d(RH) ratio is nominally affected by temperature, as shown by d(HFR)/d(RH) slopes 500, 502, 504, 506 in FIG. 5, the d(HFR)d(RH) ratio is not substantially affected by individual differences in overall membrane resistance, plate resistance, and contact resistance. Therefore, the employment of the d(HFR)/d(RH) ratio instead of the absolute HFR measurement for estimating RH of the fuel cell stack 202 is particularly advantageous.

With renewed reference to FIG. 2, the HFR measurement device 214 of the disclosure may be any known device suitable for measuring HFR of fuel cells or fuel cell components. The HFR measuring device is adapted to measure the HFR across at least one of the PEMs 6 of the fuel cell stack 202. As a nonlimiting example, the HFR measurement device 214 is in independent electrical communication with one or more of the fuel cells 2 of the fuel cell stack 202. The HFR of the at least one of the PEMs 6 is representative of the level of humidification of the fuel cell stack 202 as a whole. The HFR measurement device 214 is adapted to measure the HFR across at least a portion of the entire fuel cell stack 202. For example, the HFR measurement device 214 is in electrical communication with a first terminal and a second terminal of the fuel cell stack 202. A skilled artisan should appreciate that other configurations of the HFR measurement device 214 for measuring the HFR of the fuel cell stack 202 may be selected as desired.

The controller 212 is configured to receive at least one of the HFR measurement and the d(HFR)/d(RH) ratio calculated therefrom by way of the HFR measurement device 214. For example, the d(HFR)/d(RH) ratio may be pre-calculated from one or more HFR measurements made by the HFR measurement device 214 and then provided to the controller 212. In another embodiment, the controller 212 may include a function that calculates the d(HFR)/d(RH) ratio with the one or more HFR measurements.

It should be appreciated that the controller 212 is adapted to periodically change the operating conditions of the fuel cell stack 202. For example, the controller 212 may be adapted to adjust the fuel cell stack 202 humidification based on the d(HFR)/d(RH) ratio. A hydration of the PEMs 6 is thereby controlled to within the desired range. As a further example, the controller 212 may be adapted to control the humidity regulator in response to the d(HFR)/d(RH) ratio. The controller 212 employs at least one algorithm or mathematical model that correlates the d(HFR)/d(RH) ratio to an estimate of the RH, such as an outlet RH, of the fuel cell stack 202. The mathematical model may be a lookup table of d(HFR)/d(RH) ratio values and outlet RH values for a particular fuel cell stack 202 architecture and operating temperature, for example. Calculations using the mathematical model are performed in real-time, enabling the online measurement of the fuel cell stack 202 hydration. As a nonlimiting example, the mathematical model may include a standard recursive least-squares estimator with exponential forgetting, as is known in the art. It should be understood that other suitable algorithms or mathematical models for correlating the d(HFR)/d(RH) ratio to an estimate of the relative humidity may be employed.

The fuel cell system 200 may further include at least one additional sensor (not shown). The additional sensor may be in electrical communication with the controller 212. The additional sensor is adapted to monitor at least one of the inlet RH, outlet RH, fuel cell stack pressure, and fuel cell stack temperature. In particular embodiments, the additional sensor is a temperature sensor adapted to provide temperature measurements to the controller 212 of the fuel cell system 200. Other suitable sensors and configurations for measuring the fuel cell system 200 may be selected as desired.

The present disclosure further includes a method for online determination of the fuel cell stack 202 humidification. The method includes the step of providing the fuel cell stack 202 in electrical communication with the HFR measurement device 214 as described herein. The reactant stream 207, such as a cathode supply stream, for example, is supplied to the fuel cell stack 202. Following the step of supplying the reactant stream 207 to the fuel cell stack 202, a perturbation in the reactant stream 207 is introduced. As a nonlimiting example, the perturbation is a change in a stoichiometry of the reactant stream, such as a change in cathode stoichiometry. The change in stoichiometry may be performed, for example, by effecting a change in a flow rate of the reactant stream 207 to the fuel cell stack 202. Other suitable means for modifying the reactant stream stoichiometry may be employed as desired.

The perturbation introduced in the reactant stream 207 is adapted to provide a transient deviation in an RH of the fuel cell stack 202. From the perturbation, a system gain in HFR results. A d(HFR) value is derived from the system gain in HFR. The transient deviation in the RH is also a substantially known quantity from which d(RH) may be derived, further enabling the calculation of the d(HFR)/d(RH) ratio. In particular embodiments, the perturbation occurs at substantially regular intervals during the step of supplying the reactant stream 207 to the fuel cell stack 202. The perturbation may be a substantially constant pulse or an irregular pulse, as desired. For example, the irregular perturbation may result in an initial decrease in the RH followed by a subsequent increase in RH, both in relation to a steady state RH of the fuel cell stack 202.

A magnitude of the transient variation resulting from the perturbation is typically a fraction of the steady state RH of the fuel cell stack 202. The magnitude is selected to militate against any significant impact on the fuel cell stack 202 performance due to the perturbation. Illustratively, the magnitude of the transient variation resulting from the perturbation is less than about 20% from the steady state RH of the fuel cell stack 202. In a further embodiment, the magnitude of the transient variation is less than about 10% from the steady state RH. In a particularly illustrative embodiment, the magnitude of the transient variation is less than about 5% from the steady state RH. A skilled artisan should understand that a suitable magnitude not substantially deviating from the fuel cell stack 202 steady state RH may be selected as desired.

The transient variation in RH also occurs for a time period selected that does not substantially impact the performance of the fuel cell stack 202. For example, the transient variation in RH may be for a time period less than about 90 seconds. In one embodiment, the transient variation in RH is for a time period less than about 10 seconds. In a particularly illustrative embodiment, the transient variation in RH is for a time period less than about 5 seconds. It should be appreciated that the transient variation and time period are selected to minimize the impact on the fuel cell stack 202 performance, yet be sufficient for derivation of the d(HFR)/d(RH) ratio therefrom. For example, the transient variation provides a signal-to-noise ratio that allows a measurable HFR response.

Following the introduction of the perturbation to the reactant stream 207, the HFR of the fuel cell stack 202 is measured by the HFR measurement device 214. From the measured change in HFR and the known transient variation in RH of the fuel cell stack 202 during the perturbation, the d(HFR)/d(RH) ratio is calculated. As a nonlimiting example, if the change in HFR is about −0.035 $\Omega$-cm$^2$ and the transient deviation in RH is about 40%, at a fixed operating temperature and time period, then the calculated d(HFR)/d(RH) ratio is about −0.9 m$\Omega$-cm$^2$/%. The d(HFR)/d(RH) ratio may then be correlated in the mathematical model to RH, such as known outlet RH values of the fuel cell stack 202. The RH of the fuel cell stack 202 is thereby identified.

It should be understood that system metrics based on the d(HFR)/d(RH) ratio and the operating temperature of the fuel cell stack may be employed by the controller 212 to determine the humidification level of the fuel cell stack 202. In one embodiment, an optimized fuel cell stack 202 humidification may be indicated when the d(HFR)/d(RH) ratio is between a desired lower limit and a desired upper limit. An under-humidified or "dry" fuel cell stack is indicated when the d(HFR)/d(RH) ratio is less than the desired lower limit, for example. An over-humidified or "flooded" fuel cell stack is indicated when the d(HFR)/d(RH) ratio is greater than the desired upper limit, for example. A skilled artisan should appreciated that the desired upper and lower limits for the d(HFR)/d(RH) ratio may be selected as desired, based at least in part on operating temperature and the particular fuel cell stack 202 architecture.

The present method may also be employed for controlling the fuel cell stack 202 humidification. The method may include the step of controlling the RH of the fuel cell stack 202 in response to the d(HFR)/d(RH) ratio. For example, the system metrics including the desired upper and lower limits for the d(HFR)/d(RH) ratio may be employed by the controller 212 to operate the humidity regulator. The metrics may be "fuzzy" metrics, for example, such as d(HFR)/d(RH) ratios associated with "very dry," "dry", "normal," and "flooded," humidity conditions. The level of humidification of the fuel cell stack 202 is thereby regulated.

In one embodiment where the thermal control unit 208 is provided, the step of controlling the RH includes the step of determining a desired fuel cell stack temperature for providing the RH within the desired range. The desired fuel cell stack temperature is selected based on the calculated d(HFR)/d(RH) ratio. The coolant stream 211 may be supplied to the fuel cell stack and a temperature of the coolant stream 211 regulated to a temperature setpoint providing the desired fuel cell stack 202 temperature. The RH of the fuel cell stack 202 is thereby maintained within the desired range when the desired fuel cell stack 202 temperature is achieved, When the WVT unit 210 is provided in fuel cell system 200, the step of controlling the RH of the fuel cell stack 202 may include regulating an RH of the reactant stream 207. The change of the RH of the reactant stream 207 directly impacts the humidification of the fuel cell stack 202, and therefore, the hydration of the PEMs 6. The RH of the fuel cell stack 202 may thereby be maintained within the desired range.

EXAMPLES

Figure 6:
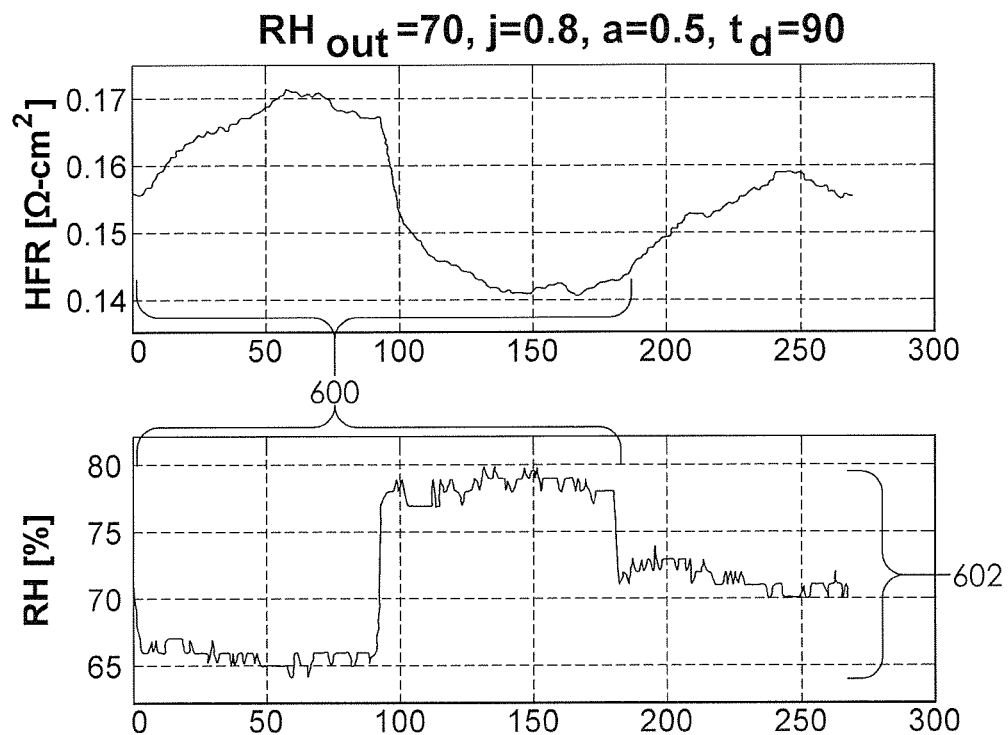
FIG. 6 is a graph depicting an illustrative perturbation in RH of a fuel cell stack under normal operation conditions and the effect on absolute HFR measurements.
Figure 7:
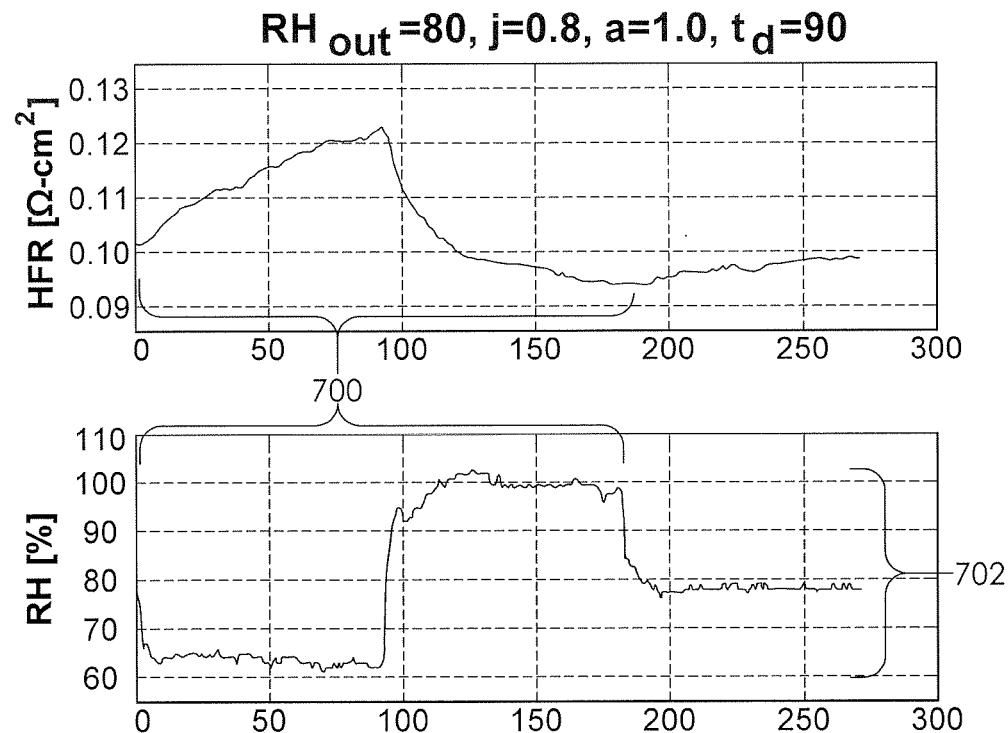
FIG. 7 is a graph depicting an illustrative perturbation in RH of a fuel cell stack under flooded operating conditions and the effect on absolute HFR measurements.

As illustrated in FIGS. 6 and 7, HFR measurements were obtained from exemplary fuel cell modules in accordance with the present disclosure. It should be appreciated that the present disclosure is not limited by the examples described herein.

In a first example illustrated in FIG. 6, a perturbation 600 was introduced in the cathode stream of a fuel cell module. The fuel cell module was operating under drier than normal humidity conditions, at an operating temperature of about 80° C. The perturbation 600 resulted in a transient variation 602 from a steady state outlet RH of about 70%. The transient variation 602 was an irregular pulse that was initially about −5% from the steady state and ended about +10% from the steady state. The magnitude of the resulting transient variation 602 was about 15%. The time period for the perturbation 600 was about 90 seconds. A d(HFR)/d(RH) ratio of about −2 m$\Omega$-cm$^2$/% for the fuel cell architecture was therefore determined to be indicative of "dry" humidification level at an operating temperature of about 80° C.

In a second example, a perturbation 700 was introduced in the cathode stream of a second fuel cell module under normally humidified conditions. As shown in FIG. 7, the perturbation 700 resulted in a transient variation 702 from a steady state outlet RH of about 80%. The magnitude of the resulting transient variation 702 was between about −10% and +20%, or about 40% total. The time period for the perturbation was about 90 seconds. A d(HFR)/d(RH) ratio of about −0.8 m$\Omega$-cm$^2$/% for the fuel cell module architecture was therefore determined to be indicative of a "normal" humidification level, at an operating temperature of about 80° C.

It is surprisingly found that the d(HFR)/d(RH) ratio allows for the estimation of the fuel cell stack 202 humidification, and hence, hydration of the PEMs 6 of the fuel cell stack 202. Therefore, the use of HFR measurements for online determination and control of the fuel cell stack 202 humidification is enabled with the fuel cell system 200 and methods of the present disclosure.

The d(HFR)/d(RH) ratio may also be used with other humidity sensors known in the art. The estimation of the fuel cell stack 202 humidification with the d(HFR)/d(RH) ratio may be employed to diagnose faults in the humidity sensors which would otherwise cause improper humidification of the fuel cell stack 202. Thus, the use of HFR measurements as described herein may be employed for system redundancy purposes, particularly in a vehicle powered by the fuel cell stack 202.

As the present system and methods facilitate humidification detection and control, the fuel cell stack 202 effective life and durability is optimized. It should also be appreciated that the use of HFR measurements in an online system for measuring and controlling humidification may be particularly useful for multi-stack systems where humidification imbalances occasionally occur. The system and methods of the present disclosure may be used to detect such imbalances, correct them, and alert the operator as desired.

While certain representative embodiments and details have been shown for purposes of illustrating the invention, it will be apparent to those skilled in the art that various changes may be made without departing from the scope of the disclosure, which is further described in the following appended claims.

What is claimed is:

1. A method for online identification of a humidification level of a fuel cell stack, the method comprising the steps of:
   providing the fuel cell stack including a plurality of fuel cells;
   providing an HFR measurement device in electrical communication with the fuel cell stack;
   supplying a reactant stream to the fuel cell stack;
   introducing a perturbation in the reactant stream supplied to the fuel cell stack, the perturbation adapted to provide a transient deviation in an RH of the fuel cell stack;
   measuring the HFR of the fuel cell stack;
   calculating a d(HFR)/d(RH) ratio from the measured HFR and the transient deviation in the RH of the fuel cell stack; and
   correlating the d(HFR)/d(RH) ratio in a mathematical model to identify an RH of the fuel cell stack.

2. The method of claim 1, wherein the reactant stream is a cathode supply stream.

3. The method of claim 1, wherein the perturbation is a change in a stoichiometry of the reactant stream.

4. The method of claim 1, wherein the perturbation is a change in a flow rate of the reactant stream.

5. The method of claim 1, wherein the perturbation occurs at substantially regular intervals during the step of supplying the reactant stream to the fuel cell stack.

6. The method of claim 1, wherein the transient variation is less than about 20% from a steady state RH of the fuel cell stack.

7. The method of claim 1, wherein the transient variation provides a signal-to-noise ratio that allows measurement of the HFR of the fuel cell stack.

8. The method of claim 1, wherein an optimized fuel cell stack humidification is indicated when the d(HFR)/d(RH) ratio is between a desired lower limit and a desired upper limit.

9. The method of claim 1, wherein an under-humidified fuel cell stack is indicated when the d(HFR)/d(RH) is less than a desired lower limit.

10. The method of claim 1, wherein an over-humidified fuel cell stack is indicated when the d(HFR)/d(RH) is greater than a desired upper limit.

11. A method for controlling a humidification level of a fuel cell stack, the method comprising the steps of:
providing the fuel cell stack including a plurality of fuel cells;
providing an HFR measurement device in electrical communication with the fuel cell stack;
supplying a reactant stream to the fuel cell stack;
introducing a perturbation in the reactant stream supplied to the fuel cell stack, the perturbation adapted to provide a transient deviation in an RH of the fuel cell stack;
measuring the HFR of the fuel cell stack;
calculating a d(HFR)/d(RH) ratio from the measured HFR and the transient deviation in the RH of the fuel cell stack;
controlling an RH of the fuel cell stack in response to the d(HFR)/d(RH) ratio, wherein the RH of the fuel cell stack is maintained within a desired range.

12. The method of claim 11, further comprising the step of correlating the d(HFR)/d(RH) ratio in a mathematical model to identify an RH of the fuel cell stack.

13. The method of claim 11, wherein the step of controlling the RH of the fuel cell stack includes the steps of:
determining a desired fuel cell stack temperature for regulating the RH of the fuel cell stack, based on the calculated d(HFR)/d(RH) ratio;
supplying a coolant stream to the fuel cell stack, the coolant stream adapted to regulate a temperature of the fuel cell stack; and
regulating a temperature of the coolant stream to a temperature setpoint adapted to provide the desired fuel cell stack temperature.

14. The method of claim 11, wherein the step of controlling the RH of the fuel cell stack includes the steps of:
providing a water vapor transfer device in fluid communication with a reactant source and the fuel cell stack;
supplying a reactant stream from the reactant source to the fuel cell stack; and
regulating an RH of the reactant stream to provide the RH of the fuel cell stack within the desired range.

* * * * *